United States Patent
Kuturianu et al.

(10) Patent No.: US 7,543,275 B2
(45) Date of Patent: Jun. 2, 2009

(54) MECHANISM FOR EXECUTING TEST SUITES WRITTEN FOR DIFFERENT HARNESSES UNDER ONE TEST EXECUTION HARNESS

(75) Inventors: Olga Kuturianu, Bat Yam (IL); Victor Rosenman, Tel Aviv (IL)

(73) Assignee: Sun Microsystems, Inc., Santa Clara, CA (US)

( * ) Notice: Subject to any disclaimer, the term of this patent is extended or adjusted under 35 U.S.C. 154(b) by 729 days.

(21) Appl. No.: 10/767,851

(22) Filed: Jan. 29, 2004

(65) Prior Publication Data

US 2005/0172268 A1 Aug. 4, 2005

(51) Int. Cl.
*G06F 9/44* (2006.01)
*G06F 11/00* (2006.01)
(52) U.S. Cl. .................... 717/124; 714/32; 714/38
(58) Field of Classification Search .......... 717/124–135
See application file for complete search history.

(56) References Cited

U.S. PATENT DOCUMENTS

| | | | |
|---|---|---|---|
| 5,922,079 A | 7/1999 | Booth et al. | |
| 6,002,868 A | 12/1999 | Jenkins et al. | |
| 6,167,352 A | 12/2000 | Kanevsky et al. | |
| 6,219,829 B1 | 4/2001 | Sivakumar et al. | |
| 6,311,149 B1 | 10/2001 | Ryan et al. | |
| 6,378,088 B1 | 4/2002 | Mongan | |
| 6,385,741 B1 | 5/2002 | Nakamura | |
| 6,393,591 B1 | 5/2002 | Jenkins et al. | |
| 6,397,378 B1 | 5/2002 | Grey et al. | |
| 6,449,731 B1 | 9/2002 | Frey, Jr. | |
| 6,560,721 B1 | 5/2003 | Boardman et al. | |
| 6,708,324 B1 | 3/2004 | Solloway et al. | |
| 6,839,647 B2 | 1/2005 | Volkov et al. | |
| 6,847,916 B1 | 1/2005 | Ying | |
| 6,868,508 B2 | 3/2005 | Grey | |
| 6,983,400 B2 * | 1/2006 | Volkov | 714/38 |
| 7,000,224 B1 * | 2/2006 | Osborne et al. | 717/125 |
| 7,010,454 B1 * | 3/2006 | Potter et al. | 702/122 |
| 7,143,310 B2 * | 11/2006 | Gavish et al. | 714/25 |
| 7,287,190 B2 * | 10/2007 | Rosenman et al. | 714/32 |
| 7,296,190 B2 * | 11/2007 | Vakrat et al. | 714/38 |
| 7,366,955 B2 * | 4/2008 | Kuturianu et al. | 714/38 |
| 2001/0053961 A1 | 12/2001 | Liu et al. | |
| 2001/0054161 A1 | 12/2001 | Wooddruff | |
| 2002/0133749 A1 | 9/2002 | Petersen et al. | |
| 2003/0131285 A1 * | 7/2003 | Beardsley et al. | 714/38 |

OTHER PUBLICATIONS

Farchi et al., Using a model-based test generator to test for standard conformance, IBM Systems Journal, vol. 41, No. 1, 2002, pp. 89-110.*

(Continued)

*Primary Examiner*—Eric B. Kiss
*Assistant Examiner*—Ben C Wang
(74) *Attorney, Agent, or Firm*—Meyertons Hood Kivlin Kowert & Goetzel, P.C.

(57) ABSTRACT

A mechanism has been developed for transforming different test suites, written for different test harnesses, into a common XML-type format that can be read by one test harness. Thus differences in the structure of the test suites is transparent to the test harness. To implement this mechanism, a component has been developed that parses XML descriptors and provides an API to the test harness.

19 Claims, 3 Drawing Sheets

OTHER PUBLICATIONS

Hartman et al., AGEDIS—Architecture, Interfaces & Tools, IBM Haifa Labs, Dec. 11, 2003, pp. 1-35.*

Sun Microsystems Inc., "Sun MicroSystems' JAVA Device Test Suite Helps Ensure Quality of Mobile Devices", Feb. 17, 2003, Sun Microsystems Inc., pp. 1-2.*

Kim Topley, The Mobile Information Device Profile and MIDlets, Part 1, Oct. 1, 2003, The O'Reilly Network, pp. 1-6.*

Kim Topley, The Mobile Information Device Profile and MIDlets, Part 5, Oct. 1, 2003, The O'Reilly Network, pp. 1-9.*

U.S. Appl. No. 10/767,850, filed Jan. 29, 2004.
U.S. Appl. No. 10/767,849, field Jan. 29, 2004.
U.S. Appl. No. 10/767,845, filed Jan. 29, 2004.
U.S. Appl. No. 10/767,848, filed Jan. 29, 2004.
U.S. Appl. No. 10/767,846, filed Jan. 29, 2004.

* cited by examiner

MECHANISM FOR EXECUTING TEST SUITES WRITTEN FOR DIFFERENT HARNESSES UNDER ONE TEST EXECUTION HARNESS

CROSS-REFERENCE TO RELATED APPLICATIONS

This application is related to U.S. application Ser. No. 10/767,849, entitled "Automated Test Execution Framework with Central Management", filed on Jan. 29, 2004.

BACKGROUND OF THE INVENTION

1. Field of the Invention

This invention relates to improvements in software and hardware design verification. More particularly, this invention relates to methods and systems for centrally managing the execution of multiple design verification test suites that were written for use by different test harnesses or frameworks.

2. Description of the Related Art

The meanings of acronyms and certain terminology used herein are given in Table 1. The terms Sun, Sun Microsystems, Java, J2EE, J2ME, J2SE, and the Sun logo are trademarks or registered trademarks of Sun Microsystems, Inc., in the United States of America and other countries. All other company and product names may be trademarks of their respective companies. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TABLE 1

| | |
|---|---|
| API | Application programming interface |
| CLDC | Connected, limited device configuration. CLDC is suitable for devices with 16/32-bit RISC/CISC microprocessors/controllers, having as little as 160 KB of total memory available. |
| DTD | Document type definition |
| HTML | Hypertext markup language |
| JAXP | Java API for XML Processing |
| J2EE | Java 2 Enterprise Edition |
| J2ME | Java 2 Micro Edition |
| J2SE | Java 2 Standard Edition |
| JAD | Java application descriptor |
| JAR | Java archive |
| JTDS | Java Device Test Suite Execution Framework |
| MIDlet | A MIDP application |
| MIDP | Mobile information device profile. A set of Java APIs, which, together with the CLDC, provides a complete J2ME application runtime environment targeted at mobile information devices. |
| XML | Extensible markup language |
| XTRF | XML test representation format |

Tools have been developed in recent years to aid in the design verification of hardware and software systems, for example software suites, hardware circuitry, and programmable logic designs. In order to assure that the design complies with its specifications, it is common to generate a large number of input or instruction sequences to assure that the design operates as intended under a wide variety of circumstances. In general, test systems produce a report indicating whether tests have been passed or failed, and, in some cases may even indicate a module that is estimated to be faulty.

Conventionally, test systems employing complex test suites employ a computer-implemented testing framework for computing devices, such as mobile information devices, and for software designed to run on such devices. A developer submits a computing product under development, typically a computing device or software that is designed to run on the device to the test system, which runs a selected battery of test programs on the product while monitoring its behavior. Each product under test requires an instance of an execution test harness, or the use of a stand-alone test execution API.

In environments where testing of a product is ongoing, different aspects may be tested by different teams. As test results are evaluated, it is often necessary to revise the product under test, or to modify the test suites themselves. In such an environment, communicating such revisions to the different testing teams, maintaining version control, synchronization among the teams, and generally coordinating the testing activities is a difficult management problem. Errors could result in inappropriate testing, thus wasting valuable time and testing resources. Indeed, failure of coordination could result in the release of an inadequately tested product into the marketplace. A related problem when many test suites are being concurrently executed is the effort of setting up each test suite with its own test harness and environment. Bundling the test harness with the test suite is not a good solution, as the effort in maintaining up-to-date versions becomes formidable as the number of concurrently operating test suites increases, and when the product or the test suites are frequently modified by different test teams.

SUMMARY OF THE INVENTION

In the above noted U.S. application Ser. No. 10/767,849, which is commonly assigned herewith, and herein incorporated by reference, a test framework having a central repository and a management unit is disclosed. The central repository contains available test suites and a single test execution harness. An example of the latter is described in commonly assigned application Ser. No. 10/347,748, entitled "Generating Standalone MIDlets from a Testing Harness", which is herein incorporated by reference.

Using the management unit, a system administrator is enabled to control active versions of the various test suites, and their individual configurations. End users of this system install clients of the central repository, using a system-provided installer program. These clients constitute test harnesses. At the client, an execution script and a local configuration file are created. When the test harness is to be executed, it loads with all designated test suites being installed, configured and ready for execution. The client always has the most updated versions of all test suites, as configured by the system administrator, using the management unit. This system operates from a single central location, without need for distributing local copies of the test harness or test suites, which could lead to loss of synchronization as updates are developed.

The arrangement disclosed in the above noted U.S. application Ser. No. 10/767,849 does not fully address the situation in which the test framework is required to execute different test suites, which have been designed for different test harnesses. In order to execute these test suites, it has previously been necessary to implement each harness with individual configurations for each of the various test suites, and to separately execute the test suites. Alternatively, the test suites could be rewritten for one harness. Both solutions are time consuming and error prone.

A mechanism has been developed for transforming different test suites, written for different test harnesses, into a common XML format that can be read by one test harness. Thus, differences in the structure of the test suites are transparent to the test harness. To implement this mechanism, a component has been developed, which parses XML descriptors and provides an API to the test harness.

The invention provides a method for testing computing devices, which is carried out by providing a plurality of suites of test programs on a server for execution by one or more computing devices that are coupled to the server, wherein the suites are represented in a plurality of formats. The method is further carried out by converting the suites to a common representation, processing the common representation in the server to define suites of converted test programs, and downloading the converted test programs from the server to the computing devices for execution.

An aspect of the method includes controlling the execution of the converted test programs by the computing devices from the server, using no more than one test harness.

In one aspect of the method conversion of the suites to the common representation is accomplished by converting the suites to a common intermediate format, and thereafter converting the common intermediate format to a native format for use in processing the common representation in the server.

According to another aspect of the method, the common intermediate format is a markup language.

According to a further aspect of the method, the markup language is XML, and the suites are converted into XTRF files.

The invention provides a computer software product, including a computer-readable medium in which computer program instructions are stored, which instructions, when read by a computer, cause the computer to perform a method for testing computing devices, which is carried out by inputting a plurality of suites of test programs on a server for execution by one or more computing devices that are coupled to the server, wherein the suites are represented in a plurality of formats. The method is further carried out by converting the suites to a common representation, processing the common representation into suites of converted test programs, downloading the converted test programs to the computing devices for execution thereof by the computing devices, and controlling the execution of the converted test programs by the computing devices.

The invention provides a server apparatus for testing computing devices, including a communication interface for coupling a plurality of the computing devices therewith, and a processor, which is adapted to provide a suite of test programs for execution by the computing devices, and to download the test programs via the communication interface for execution by the computing devices coupled thereto. The processor is further adapted to control the execution by the computing devices, wherein the test programs are initially input to the server apparatus in a plurality of formats. The processor is further adapted to convert the plurality of formats into a common format for download thereof to the computing devices.

BRIEF DESCRIPTION OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

In the following description, numerous specific details are set forth in order to provide a thorough understanding of the present invention. It will be apparent to one skilled in the art, however, that the present invention may be practiced without these specific details. In other instances well-known circuits, control logic, and the details of computer program instructions for conventional algorithms and processes have not been shown in detail in order not to unnecessarily obscure the present invention.

Software programming code, which embodies aspects of the present invention, is typically maintained in permanent storage, such as a computer readable medium. In a client/server environment, such software programming code may be stored on a client or a server. The software programming code may be embodied on any of a variety of known media for use with a data processing system, This includes, but is not limited to, magnetic and optical storage devices such as disk drives, magnetic tape, compact discs (CD's), digital video discs (DVD's), and computer instruction signals embodied in a transmission medium with or without a carrier wave upon which the signals are modulated. For example, the transmission medium may include a communications network, such as the Internet.

System Architecture.

Figure 1:
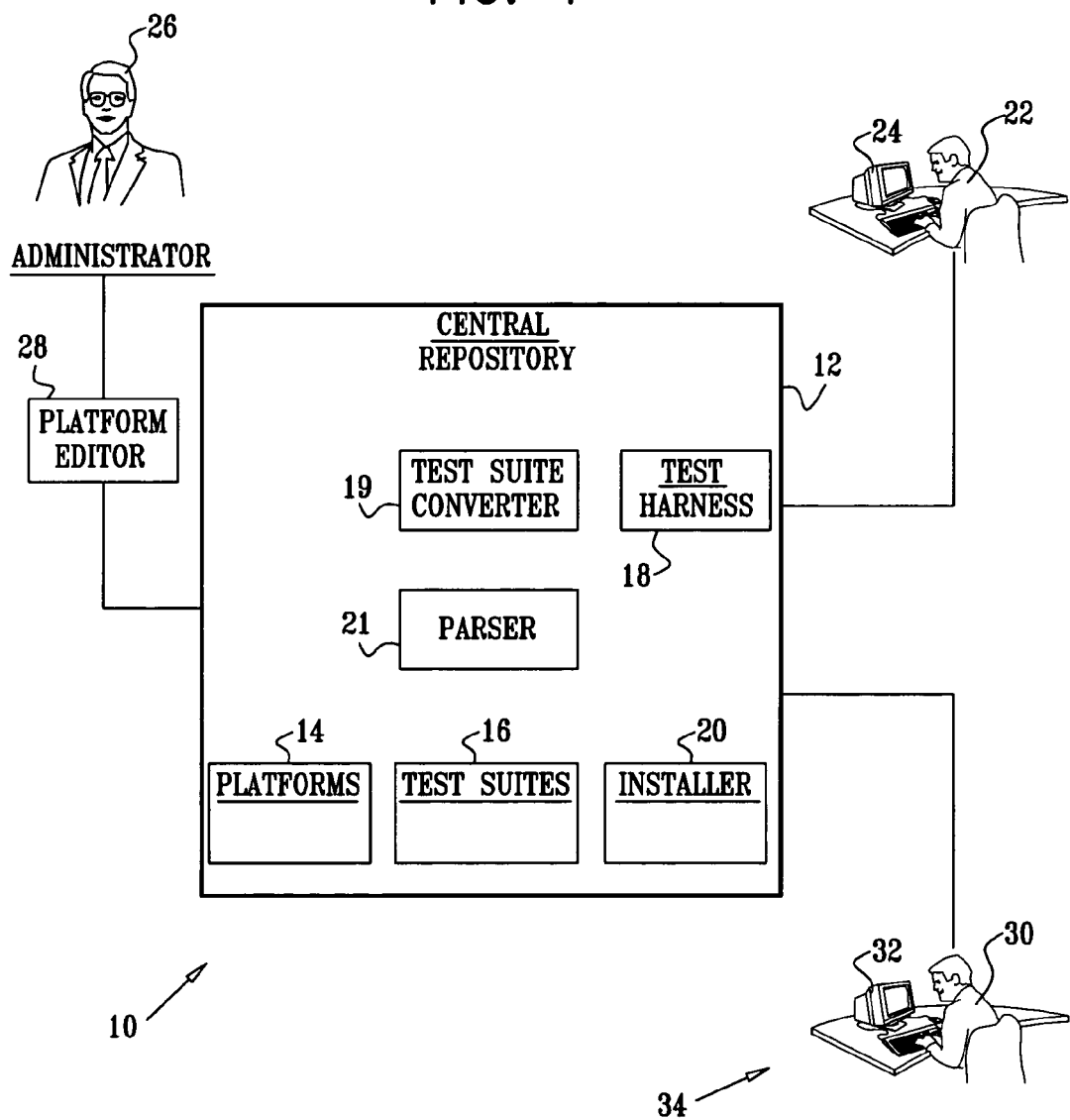
FIG. 1 is a block diagram of a system for centrally managing the execution of multiple test suites, which have been written for different test harnesses.

Turning now to the drawings, reference is initially made to FIG. 1, which is a high level block diagram of a system 10 for centrally managing the simultaneous or sequential execution of multiple test suites that have been written for different platforms for verifying different hardware and software, in accordance with a disclosed embodiment of the invention. The heart of the system 10 is a central repository 12, which can reside on a local or a remote server, and which contains data structures necessary for multiple clients of the central repository 12 to perform testing simultaneously, or at different times. The central repository 12 holds data structures that define platforms 14, test suites 16, an execution test harness 18, and an installer 20. The installer 20 creates a script for launching the framework. The script includes paths to binary files of the test execution framework. The binaries themselves are located in only one place, the central repository 12. Centrally locating the binary files is highly advantageous, as only one instance of each binary file need be updated. Furthermore, each user is guaranteed to see the most current version of the framework. Because distribution of local copies of the binaries is avoided, users need not be concerned about having outdated software. The execution test harness 18 may be implemented as a modification of the test framework "Java Device Test Suite" execution framework (JDTS) (version 1.0 or higher), available from Sun Microsystems, Inc., Palo Alto, Calif., which employs MIDP.

Alternatively, it is possible to practice the invention using distributed data repositories, so long as they are accessible to a central management module.

Typically the installation is packaged in an archive, such as a JAR file. The system 10 is capable of being controlled by a single operator 22, using a client terminal 24. However, in many environments it is desirable that a superuser, or administrator 26 manage the central repository 12. This is done using a platform editor 28, which acts as a management unit. Using the platform editor 28, the administrator 26 is capable of reconfiguring the platforms 14, test suites 16, execution test harness 18, and installer 20. An end user 30 interacts with the central repository 12 via a client terminal 32. The end user 30 launches an execution package, which is first downloaded and installed from the central repository 12. The end user 30 and the terminal 32 may be co-located with the other components of the system 10, or alternatively may be located remotely and connected to the central repository 12 via a data network. Although only one instance of the end user 30 is shown, it will be understood that many end users can interact with the central repository 12 concurrently, or at different times, using the same or different platforms and the same or different test suites. The end user 30 and the terminal 32 are referred to hereinbelow as a client 34.

In addition to handling native test suites, the system 10 is capable of managing foreign test suites, which were originally written for previous versions of the test harness 18, or even other test harnesses, thus allowing such foreign test suites to be recycled. This is accomplished using a conversion module 19, which converts test suites in diverse formats to a common intermediate representation, which is one or more XTRF files. A parser 21 then converts the XTRF files into a native format suitable for the test harness 18. The test suites 16 may be stored in the native format for immediate use by the test harness 18. Alternatively, they may be stored as XTRF files, and submitted to the parser 21 when needed by the test harness 18. Using this arrangement, any number of test programs and different test suites can be executed using no more than one test harness.

The system 10 is suitable for use in many development environments, including MIDlet development using J2ME. It may be adapted to J2EE and J2SE environments using programming techniques known to the art.

System—Functional Organization.

Continuing to refer to FIG. 1, the central repository 12 contains test parameters, platform configuration parameters, framework parameters and the tests themselves. The end user 30 makes use of the central repository 12 in a "session". In an implementation of a session for a framework application in the execution state, contents of the central repository 12 are stored and loaded. The disclosure of the system implementation is common to the platform editor 28, which manages platforms using the central repository 12, and to other aspects of the execution framework, such as the installer 20. The installer 20 creates an execution script and local configuration files. The execution test harness 18 is not downloaded. Its binary files remain on the central repository 12.

Figure 2:
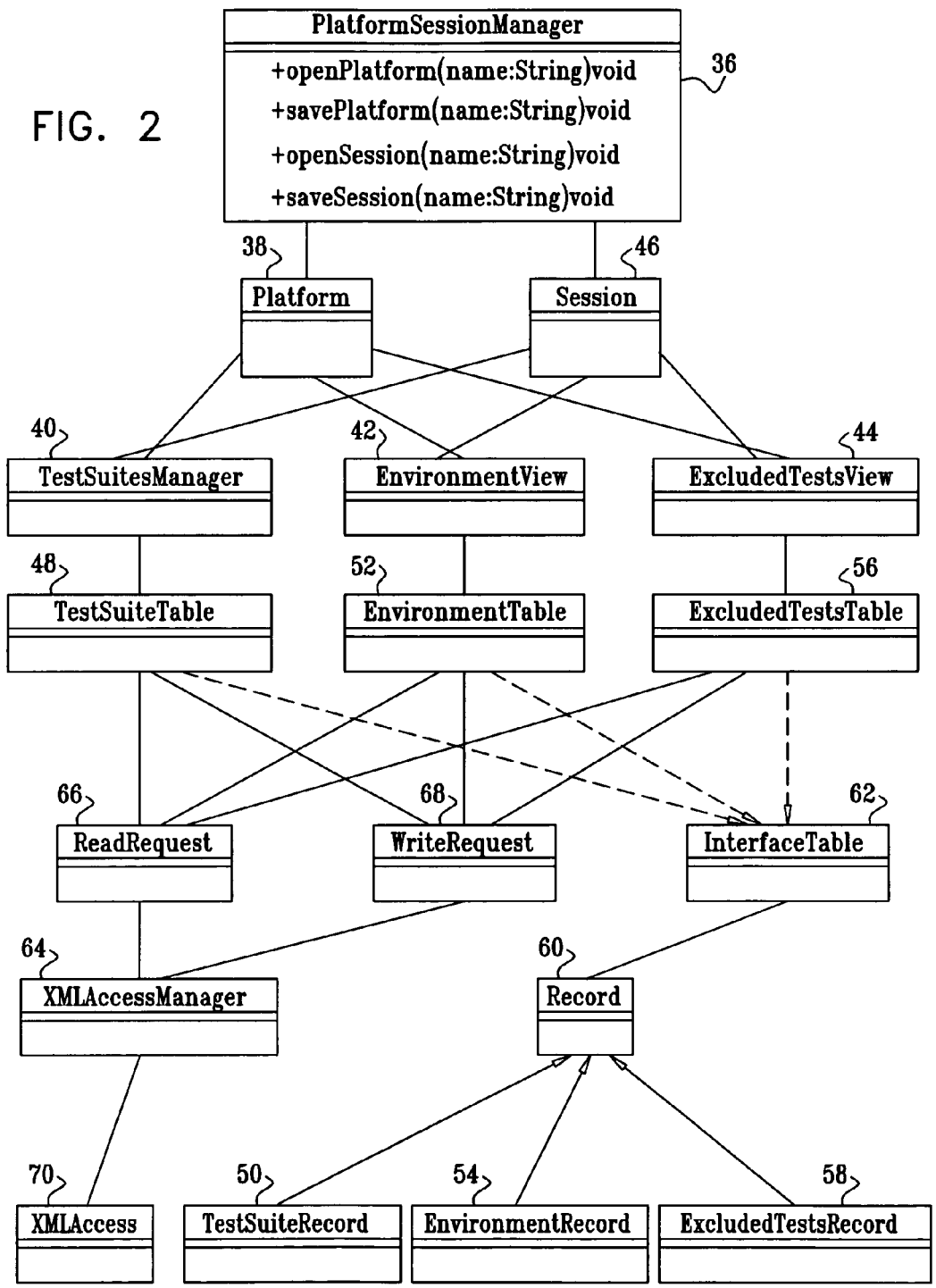
FIG. 2 is a high level functional block diagram of an implementation of a platform editor in the system of FIG. 1, in accordance with a disclosed embodiment of the invention.

Reference is now made to FIG. 2, which is a high level functional block diagram of an implementation of the platform editor 28 (FIG. 1) in accordance with a disclosed embodiment of the invention. A class PlatformSessionManager 36 has methods for loading and saving platforms and sessions.

A class Platform 38 encapsulates all platform specific information. An instance of the class Platform 38 includes such information as available test suites, and their respective properties, as well as other platform-specific information. The test suites and their properties are managed by a class TestSuitesManager 40. Platform-specific information is managed by a class EnvironmentView 42. Tests in the test suites can be excluded from performance by a class ExcludedTestsView 44.

A class Session 46 encapsulates all information specified by the client 34 (FIG. 1). Such client specific information includes the basic properties of the test suites and the platform that applies to a particular session of the client 34.

The class Platform 38 and the class Session 46 interact with the class TestSuitesManager 40, the class EnvironmentView 42, and the class ExcludedTestsView 44.

The class TestSuitesManager 40 interacts with a table TestSuiteTable 48, which contains records of the different test suites, as indicated by a class TestSuiteTable 50.

The class EnvironmentView 42 interacts with a table EnvironmentTable 52, which contains records of known platform environments, as indicated by a representative table EnvironmentRecord 54.

The class ExcludedTestsView 44 interacts with a table ExcludedTestsTable 56, which contains records of excluded tests, as indicated by a representative class ExcludedTestsRecord 58.

Records originating from the class TestSuiteTable 50, the table EnvironmentRecord 54, and the class ExcludedTestsRecord 58, are included in a class record 60, and initially written to an interface table 62, before being ultimately transferred to an appropriate one of the table EnvironmentTable 52, the table EnvironmentRecord 54, or the table ExcludedTestsTable 56.

A class XMLAccessManager 64 accepts requests from the class TestSuitesManager 40, the class EnvironmentView 42, and the class ExcludedTestsView 44 for read or write operations to and from the class Platform 38 and the class Session 46. The class XMLAccessManager 64 manages queues of read requests 66, write requests 68, and executes them sequentially.

A class XMLAccess 70 contains a single access point to XML files that represent platforms and sessions. It has methods for read/write access to these XML files.

Further details of the implementation of the platform editor 28 (FIG. 1) are disclosed in the above noted U.S. application Ser. No. 10/767,849.

Test Suite Transformation—General.

Figure 3:
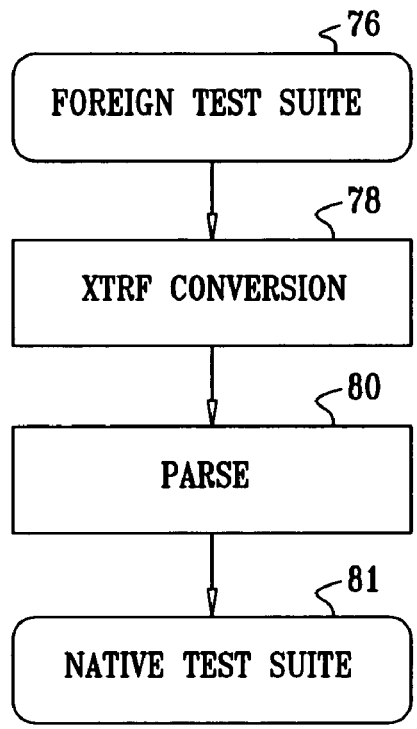
FIG. 3 is a flow chart illustrating the transformation of a foreign test suite into a native test suite in accordance with a disclosed embodiment of the invention.

Reference is now made to FIG. 3, which is a flow chart illustrating the transformation of a foreign test suite, which has been written for a test framework other than the test harness 18 (FIG. 1), into a native test suite suitable for execution using the test harness 18 and a suitable target device in accordance with a disclosed embodiment of the invention. The target device could be the client terminals 24, 32, or devices (not shown) attached thereto. This is accomplished by first converting the foreign test suite into a common intermediate file, a XTRF file, which is a XML representation of a test suite. The XTRF file is then parsed so as to generate a test suite, which is native to the test harness 18.

As shown in Listing 1, which is a DTD of the XTRF format, a XTRF file describes the content of a test suite, that is the various classes, and tests it contains, and the parameters and external entities, which are used by the test suite. Other XML tags not shown in Listing 1 can optionally be included in a XTRF file.

At initial step 76 a foreign test suite is selected. Next, at step 78 the foreign test suite is input into the conversion module 19, which is capable of converting different foreign test suite formats into a common format, expressed as one or more XTRF files. The details of the conversion module are disclosed in further detail hereinbelow. In some embodiments, the intermediate XTRF files may be stored as the test suites 16 (FIG. 1).

Next, at step 80, the XTRF files that were generated in step 78 are submitted to the parser 21, which converts them into a native test suite representation 81 that is recognized by the test harness 18. Listing 2 is a Java code package that implements a parser for use in step 80.

XTRF File Generation.

Figure 4:
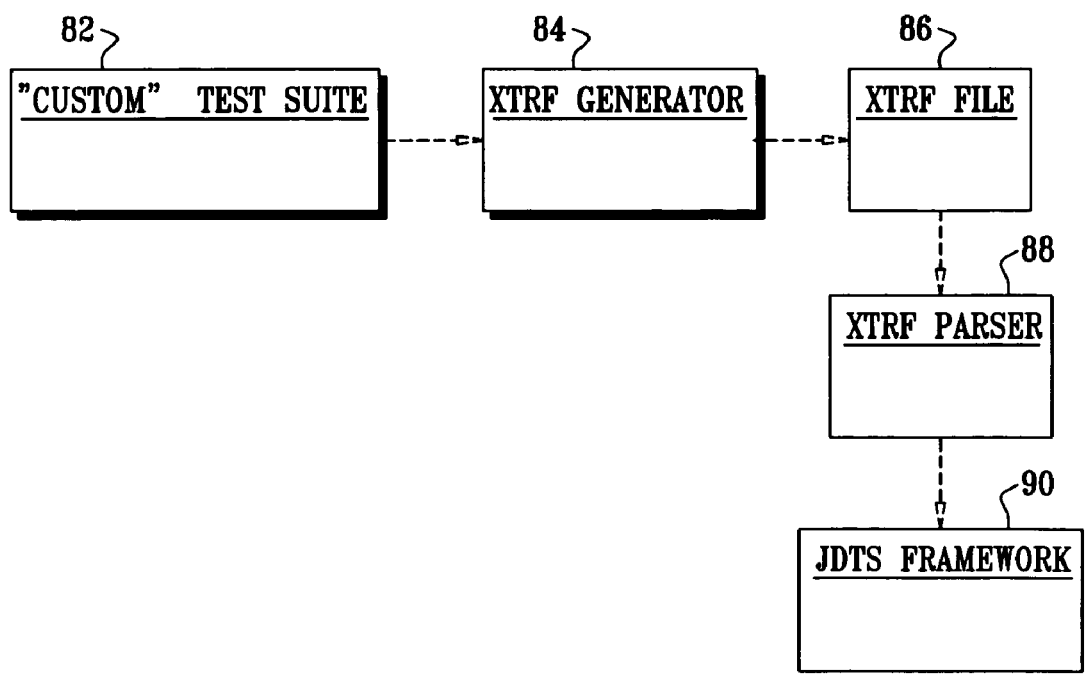
FIG. 4 is a block diagram illustrating the generation and processing of a XTRF file according to a disclosed embodiment of the invention.

Reference is now made to FIG. 4, which is a block diagram illustrating the generation and processing of a XTRF file according to a disclosed embodiment of the invention. A custom test suite 82 is typically written according to a custom API, which is different from the API of the Java Device Test Suite execution framework. Using the code fragment of Listing 3 a custom test suite representation can be scanned, and a XTRF generator 84 can be used to output a XTRF file 86 representing the test suite. This is accomplished using a XTRF Generator API, details of which are presented hereinbelow in Appendix 1.

XTRF Parsing.

Continuing to refer to FIG. 4, the XML descriptors contained in the XTRF file 86 are parsed by a parser 88. The parser 88 provides an API to a test harness 90, which could be the test harness 18 (FIG. 1). Using the parser 88, the test harness 90 is able to interpret and process the XTRF file 86. Details of this API are given hereinbelow in Appendix 2.

EXAMPLE

Continuing to refer to FIG. 4, a test prepared for a test harness other than the test harness 90 is presented in Listing 4, and is an example of a portion of the test suite 82, which in its present form is unacceptable to the test harness 90. The program shown in Listing 4 can be submitted to the XTRF generator 84 and the parser 88, as disclosed above. The final output of the parser 88 is acceptable to the test harness 90.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

Computer Program Listings

Imported modules stated in program listings hereinbelow are components of JAXP (ver 1.2 or higher) or other standard Java API's of J2SE, both available from Sun Microsystems, Inc.

Listing 1

```
<!DOCTYPE testsuite [
    <!ELEMENT group (class*)>
    <!ATTLIST group name CDATA #REQUIRED>
    <!ELEMENT class (testcase*)>
    <!ATTLIST class name CDATA #REQUIRED>
    <!ATTLIST class package CDATA #REQUIRED>
    <!ELEMENT testcase (requiredclass*,property*,keyword*)>
    <!ATTLIST testcase name CDATA #REQUIRED>
      <!ELEMENT requiredclass EMPTY>
      <!ATTLIST requiredclass name CDATA #REQUIRED>
      <!ELEMENT property EMPTY>
      <!ATTLIST property name CDATA #REQUIRED>
      <!ELEMENT keyword EMPTY>
      <!ATTLIST keyword name CDATA #REQUIRED>
      <ELEMENT testsuite EMPTY>
      <!ATTLIST testsuite name CDATA #REQUIRED>
]>
```

Listing 2

```
package com.sun.xtrf.parser;
import java.io.*;
import org.w3c.dom.*;
import javax.xml.parsers.DocumentBuilderFactory;
import javax.xml.parsers.DocumentBuilder;
import org.xml.sax.SAXException;
import org.xml.sax.SAXParseException;
import com.sun.xml.tree.*;
import java.lang.reflect.*;
import java.util.*;
class XTRFParser
{
private static GroupMap groupMap = new GroupMap( );
        public void init( )
        {
            try
            {
                //load all tags handlers classes from properties file
                Properties propertiesFile = new Properties( );
                propertiesFile.load(this.getClass( ).getResourceAsStream
                    ("xtrf.properties"));
                //load tag handlers
                String str = properties
                    File.getProperty("tagHandlers.list");
                //get the name of the class
                StringTokenizer token = new StringTokenizer(str, ";");
                while(token.hasMoreElements( ))
```

-continued

Listing 2

```
            {
                //create instance of each class
                Class cls = Class.forName(token.nextToken( ));
                cls.newInstance( );
            }
        }
        catch(Exception e)
        {
            System.err.println("An exception has occurred
              during the class
              loading "+
                    e.getClass( ).getName( ) + ": " + e.getMessage( ) );
            e.printStackTrace(System.err);
        }
    }
    /**
    * Parsing a XML document stored in a file.
    **/
    TestGroup getRoot(File f)
        {
            Document doc;
            Element el=null;
            try {
                    DocumentBuilderFactory docBuilderFactory = Document
                    BuilderFactory.newInstance( );
                    DocumentBuilder docBuilder =
                            docBuilderFactory.newDocumentBuilder( );
                    doc = docBuilder.parse (f);
                    el = doc.getDocumentElement ( );
                    // normalize text representation
                    el.normalize ( );
                    System.out.println ("Root element of the doc is " +
                            doc.getDocumentElement( ).getNodeName( ));
            } catch (SAXParseException err) {
                    System.out.println ("** Parsing error"
                            + ", line " + err.getLineNumber ( )
                            + ", uri " + err.getSystemId ( ));
                    System.out.println("          " + err.getMessage ( ));
                    // print stack trace as below
            } catch (SAXException e) {
                    Exception x = e.getException ( );
                    ((x == null) ? e : x).printStackTrace ( );
            } catch (Throwable t) {
                    t.printStackTrace ( );
            }
            //System.exit (0);
            groupMap.init( );
            return loadGroup(el);
            //additionalMap.init( );
        }
private TestGroup loadGroup(Element el)
{
Class[ ] param={Element.class,XTRFParser.class};
Object[ ] obj = {el,new XTRFParser( )};
TestGroup testGroup=null;
try
    {
        Class cls =
        Class.forName((String)groupMap.get(el.getNodeName( )));
        Constructor constructor =
         cls.getDeclaredConstructor(param);
        testGroup=(TestGroup)constructor.newInstance(obj);
        NamedNodeMap attr=el.getAttributes( );
        processAttributes(attr,testGroup);
    }
catch(Exception e)
    {
        e.getMessage( );
        e.printStackTrace( );
    }
return testGroup;
}
void processAttributes(NamedNodeMap attr,TestGroup testGroup)
        {
                if(attr!=null)
                        {
                                for(int j=0;j < attr.getLength( ); j++)
```

Listing 2

```
                {
                    testGroup.putAttribute(attr.item(j).
                        getNodeName( ),attr.item(j).
                        getNodeValue( ));
                }
            }
        }
    }
    TestGroup[ ] parse(Element el,TestGroup parent)
    {
        NodeList nodeList = el.getChildNodes( );
        LinkedList groups=new LinkedList( );
        TestGroup testGroup=null;
        for(int i=0; i < nodeList.getLength( ); i++)
        {
            Node child = nodeList.item(i);
            String name = nodeList.item(i).getNodeName( );
            if(groupMap.has(name))
            {
                try
                {
                    Class[ ] param={Element.class,XTRFParser.class};
                    Object[ ] obj={child,this};
                    Class cls = Class.forName((String)
                        groupMap.get(name));
                    Constructor constructor =
                        cls.getDeclaredConstructor(param);
                    testGroup=(TestGroup)constructor.newInstance(obj);
                    testGroup.addParent(parent);
                    NamedNodeMap attr=child.getAttributes( );
                    processAttributes(attr,testGroup);
                    if(! (testGroup instanceof RequiredClassHandler))
                        groups.add(testGroup);
                }
                catch(Exception e)
                {
                    e.getMessage( );
                    e.printStackTrace(System.err);
                }
            }
            NodeList newLs =  child.getChildNodes( );
            if(newLs!=null)
            {
                for(int j=0; j < newLs.getLength( ); j++)
                {
                    TestGroup newTestGroup = null;
                    child = newLs.item(j);
                    name = newLs.item(j).getNodeName( );
                    Registration regist = new Registration( );
                    if(regist.has(name))
                    {
                        TagHandler handler = regist.get(name);
                        handler.handleTag(testGroup,child);
                    }
                }
            }
        }
        TestGroup tGroups[ ] = new TestGroup[groups.size( )];
        for(int i=0;i < groups.size( ); i++)
        {
            System.out.println(i);
            tGroups[i]=(TestGroup)groups.get(i);
        }
        return tGroups;
    }
}
```

Listing 3

```
import com.sun.xtrf.generator.*;
//this is the XTRF API package (xtrf api)
import java.lang.reflect.Method;
import java.io.*;
import java.util.*;
```

Listing 3

```java
import java.net.*;
public class TckGenerator
{
    public static void main(String[ ] args) {
        TckGenerator gen = new TckGenerator( );
        gen.generate(args[0], args[1]);
    }
}
//directory that containes test sources
String sourceDir;
Map hash = new HashMap( );
Map tmpHash =new HashMap( ) ;
TagGenerator ancestor;
String[ ] globalArgs;
/**
* creates components that read tck test suite files
* and perform generating
**/
public void generate(String outputDir,String inputDir)
{
    XtrfGenerator gen = new XtrfGenerator(outputDir);
    //part of the XTRF Generator API
    //it's used to start new xtrf document
    TagGenerator root = gen.createRoot("testsuite.xml");
    //create root of the document
    //call the document "testsuite.xml"
    ancestor=root;
    generateTree(root,inputDir);
    gen.finishGenerating( );
}
/**
* generates the xtrf file that will be read by the framework
**/
private void generateTree(TagGenerator root, String inputDir)
{
    File testSuite = null;
    String logFileName = null;
    String outputFileName = "testsDescr.txt";
    int tfMode = 2;
    boolean needTestCases = true;
    File[ ] initialFiles = null;
    String prevDir=null;
    TagGenerator groupRoot=root;
    Map map = new HashMap( );
    testSuite = new File(inputDir);
    //This method takes all tests related info from the tck
    // test suite and converts it to xtrf format
    File f = new File(testSuite, ".." + File.separator +
       "classes" + File.separator + "shared" + File.separator +
       "testClasses.lst");
    FileInputStream stream = null;
    try
    {
        stream = new FileInputStream(f);
    }
    catch(Exception e)
    {
        e.getMessage( );
        e.printStackTrace( );
    }
    BufferedReader reader = new BufferedReader(new
     InputStreamReader(stream));
    String line;
    try
    {
        while((line = reader.readLine( ))!=null)
        {
            map.put(line.substring(0,line.indexOf
                (" ")).trim( ),line.substring(line.indexOf
                (" ")+1,line.length( )).trim( ));
        }
    }
    catch(Exception e)
    {
        e.getMessage( );
        e.printStackTrace( );
    }
```

-continued

Listing 3

```
try
{
    testSuite = new File(inputDir);
    testSuite = new File(testSuite.getCanonicalPath( ));
    File testSuiteClasses = null;
    if (needTestCases) {
        if (testSuite.isDirectory( ))
        {
            testSuiteClasses = new File(testSuite, ".." +
              File.separator + "classes");
        }
        else
        {
            testSuiteClasses = new File(testSuite.getParent( ),
            ".." + File.separator + "classes");
        }
        if (!testSuiteClasses.exists( ))
    }
        TestFinderWrapper tf=null;
        tf = new TestFinderWrapper( );
        tf.setMode(tfMode);
        tf.setRoot(testSuite);
        if (logFileName != null) {
            log = new PrintWriter(new BufferedWriter (
                     new FileWriter(logFileName)));
            tf.setVerify(true);
        }
        TestFinderQueueWrapper tfq = new
         ;TestFinderQueueWrapper( );
        tfq.setTestFinder(tf.getTestFinder( ));
        tfq.setInitialFiles(testSuite, initialFiles);
        TestDescriptionWrapper td;
        while ((td = tfq.next( )) != null) {
            String[ ] keywords = td.getKeywords( );
            String dir = td.getRootRelativePath( ).substring(0,td.
              getRootRelativePath( ).indexOf(td.getDir( ).getName( ))
              + td.getDir( ).getName( ).length( ));
            root = createGroups(groupRoot,dir,prevDir);
            groupRoot=root;
            prevDir =dir;
            if (needTestCases) {
                String executeClassName =
                  td.getParameter("executeClass");
                root = root.addChildTag("class",
                  executeClassName.substring
                  (executeClassName.lastIndexOf
                  (".")+1,executeClassName.length( )));
                //add info to xtrf using the api
                if(executeClassName.indexOf(".")!=-1)
                    root.setAttribute
                      ("package",executeClassName.substring
                      (0,executeClassName.lastIndexOf(".")));
                        String[ ] testCases = getTestCases
                        (td, testSuiteClasses,root);
                        TagGenerator temp = null;
                        if (testCases != null) {
                            for (int i = 0; i < testCases.length; i++) {
                                if (!testCases[i].equals("get Status"))
                                {
                                    temp=root;
                                    root = root.addChildTag("testcase",
                                        testCases[i]);
                                    createRequiredClasses
(root,td.getRootRelativeURL( ),map);
                                    addKeywords(root,keywords);
                                    root=temp;
                                }
                            }
                        }
                }
            }
        }
    catch(Exception e)
    {
        e.getMessage( );
        e.printStackTrace( );
    }
}
```

-continued

Listing 3

```
private void addKeywords(TagGenerator root, String[ ] keywords)
{
    if(keywords !=null)
    {
        for(int i=0; i < keywords.length; i++)
        {
            root.addChildTag("keyword",keywords[i]);
        }
    }
}
private void createRequiredClasses(TagGenerator root, String
key,Map map)
{
    if(map.containsKey(key))
    {
        String values = (String)map.get(key);
        StringTokenizer tok = new StringTokenizer(values, ",");
        while(tok.hasMoreElements( ))
        {
            String t = tok.nextToken( ).trim( );
            root.addChildTag("requiredclass",t);
        }
    }
    TagGenerator createGroups(TagGenerator root,
      String dir,String prevDir)
{
StringTokenizer tokDir = new
StringTokenizer(dir,File.separator);
boolean flag=false;
if(dir.equals(prevDir))
    return root;
else if(prevDir==null)
{
    while(tokDir.hasMoreTokens( ))
    {
        String curr = tokDir.nextToken( );
        root = root.addChildTag("group",curr);
        hash.put(curr,root);
    }
}
else
{
    StringTokenizer tokPrev = new
    StringTokenizer(prevDir,File.separator);
    String prevRoot=null;
    while(tokDir.hasMoreTokens( ) && tokPrev.hasMoreTokens( ))
    {
        String curr = tokDir.nextToken( );
        String prev = tokPrev.nextToken( );
        if((prevRoot==null) && (!curr.equals(prev)))
        {
            root=ancestor;
            flag=true;
        }
        else if(!curr.equals(prev) && !flag)
        {
            flag=true;
            root = (TagGenerator)hash.get(prevRoot);
        }
        if(!curr.equals(prev) || flag)
        {
            flag=true;
            root = root.addChildTag("group",curr);
            hash.put(curr,root);
        }
        prevRoot=prev;
    }
    while(tokDir.hasMoreTokens( ))
    {
        String curr = tokDir.nextToken( );
        root = root.addChildTag("group",curr);
    }
}
flag=false;
return root;
}
```

Listing 3

```
String[ ] getTestCases(TestDescriptionWrapper td, File
classDir,TagGenerator root) {
String executeClassName = td.getParameter("executeClass");
if (executeClassName == null) {
System.err.println(td.getRootRelativePath( ) +
" is apparently a runtime test but does not have an
executeClass specified.");
return null;
}
PathClassLoaderWrapper loader = new
PathClassLoaderWrapper(classDir.getPath( ));
try {
    Class c = loader.loadClass(executeClassName);
    if (isMultiTest(c, loader)) {
        String[ ] args =
          StringArrayWrapper.split(td.getParameter("executeArgs"));
        for (int i = 0; i < args.length; i++) {
            if (args[i].equalsIgnoreCase("-TestCaseID")) {
                // if -TestCaseID followed by ALL, drop out
                // and determine all test cases; otherwise,
                //get args up to next option (-*).
                int first = ++i;
                if (first < args.length && args[first].equals("ALL"))
                    break;
                while (i < args.length && !args[i].startsWith("-"))
                    i++;
                    String[ ] testCases = new String[i – first];
                    System.arraycopy(args, first, testCases, 0,
                      testCases.length);
                    return testCases;
            }
        }
        // no -TestCaseID found, or -TestCaseID ALL found
        // go use reflection to determine the test cases
        return getTestCases(c, loader);
    }
    else
    {
        String[ ] cases = new String[1];
        cases[0]="testcase1";
        return cases;
    }
}
catch (Exception e) {
    e.getMessage( );
    e.printStackTrace( );
}
return null;
}
private void setPackageName(TagGenerator tag, String path)
{
    tag.setAttribute("package",path.substring(1));
}
}
```

Listing 4

```
import com.sun.xtrf.generator.*;
//this is XTRF API package - see Appendix 2
import java.lang.reflect.Method;
import java.io.*;
import java.util.*;
import java.net.*;
public class TckGenerator
{
    public static void main(String[ ] args) {
        TckGenerator gen = new TckGenerator( );
        gen.generate(args[0], args[1]);
    }
    //directory that containes test sources
    String sourceDir;
    Map hash = new HashMap( );
    Map tmpHash =new HashMap( ) ;
    TagGenerator ancestor;
    String[ ] globalArgs;
    /**
     * creates components that read tck test suite files and
    perform generating
     **/
    public void generate(String outputDir,String inputDir)
    {
        XtrfGenerator gen = new
        XtrfGenerator(outputDir);
        //part of the XTRF Generator API
        //it's used to start new xtrf document
            TagGenerator root =
        gen.createRoot("testsuite.xml");
```

-continued

Listing 4

```
//create root of the document - call the document
//"testsuite.xml"
                            ancestor=root;
                            generateTree(root,inputDir);
                            gen.finishGenerating( );
      }
      /**
       * generates the xtrf file that will be read by
       * the framework
       **/
      private void generateTree(TagGenerator root,
        String inputDir)
      {
              File testSuite = null;
              String logFileName = null;
              String outputFileName = "testsDescr.txt";
              int tfMode = 2;
              boolean needTestCases = true;
              File[ ] initialFiles = null;
              String prevDir=null;
              TagGenerator groupRoot=root;
              Map map = new HashMap( );
              testSuite = new File (inputDir);
              //This method takes all tests related info from the
              //tck test suite and converts it to xtrf format
File f = new File(testSuite, ".." + File.separator + "classes"
+ File.separator + "shared" + File.separator +
"testClasses.lst");
FileInputStream stream = null;
      try
          {
              stream = new FileInputStream(f);
          }
      catch(Exception e)
          {
              e.getMessage( );
              e.printStackTrace( );
          }
BufferedReader reader = new BufferedReader(new
InputStreamReader(stream));
  String line;
  try
      {
              while((line = reader.readLine( ))!=null)
              {
                map.put(line.substring(0,line.indexOf
                    (" ")).trim( ),line.substring(line.indexOf
                    (" ")+1,line.length( )).trim( ));
              }
      }
catch(Exception e)
      {
         e.getMessage( );
         e.printStackTrace( );
      }
try
      {
    testSuite = new File(inputDir);
    testSuite = new File(testSuite.getCanonicalPath( ));
    File testSuiteClasses = null;
    if (needTestCases) {
              if (testSuite.isDirectory( ))
              {
                  testSuiteClasses = new File(testSuite, ".." +
                      File.separator + "classes");
              }
              else
              {
                  testSuiteClasses = new File (testSuite.getParent( ),".." +
                  File.separator + "classes");
              }
              if (!testSuiteClasses.exists( ))
      }
TestFinderWrapper tf=null;
tf = new TestFinderWrapper( );
tf.setMode(tfMode);
tf.setRoot(testSuite);
```

-continued

Listing 4

```
if (logFileName != null) {
        log = new PrintWriter(new BufferedWriter
            (new FileWriter(logFileName)));
        tf.setVerify(true);
   }
   TestFinderQueueWrapper tfq = new TestFinderQueueWrapper( );
   tfq.setTestFinder(tf.getTestFinder( ));
   tfq.setInitialFiles(testSuite, initialFiles);
   TestDescriptionWrapper td;
   while ((td = tfq.next( )) != null) {
   String[ ] keywords = td.getKeywords( );
   String dir =
td.getRootRelativePath( ).substring
    (0,td.getRootRelativePath( ).indexOf(td.getDir( ).getName( )) +
    td.getDir( ).getName( ).length( ));
   root = createGroups(groupRoot,dir,prevDir);
   groupRoot=root;
   prevDir =dir;
   if (needTestCases) {
   String executeClassName =
           td.getParameter("executeClass");
   root = root.addChildTag
       ("class",executeClassName.substring
       (executeClassName.lastIndexOf(".")+1,
       executeClassName.length( )));
//add info to xtrf using the api
if(executeClassName.indexOf(".")!=-1)
root.setAttribute("package",executeClassName.substring
       (0,executeClassName.lastIndexOf(".")));
   String[ ] testCases = getTestCases(td, testSuiteClasses,root);
   TagGenerator temp = null;
   if (testCases != null) {
       for (int i = 0; i < testCases.length; i++) {
                       if(!testCases[i].equals("getStatus"))
                       {
                            temp=root;
                            root = root.addChildTag("testcase",
                                testCases[i]);
           createRequiredClasses(root,td.getRootRelativeURL( ),map);
           addKeywords(root,keywords);
           root=temp;
                       }
               }
        }
       }
     }
   }
   catch(Exception e)
         {
            e.getMessage( );
            e.printStackTrace( );
         }
   }
private void addKeywords(TagGenerator root,String[ ] keywords)
   {
   if(keywords!=null)
       {
           for(int i=0; i < keywords.length; i++)
               {
                       root.addChildTag("keyword",keywords[i]);
               }
       }
}
private void createRequiredClasses(TagGenerator root,
    String key,Map map)
{
   if(map.containsKey(key))
           {
          String values = (String)map.get(key);
          StringTokenizer tok = new StringTokenizer(values, ",");
          while(tok.hasMoreElements( ))
               {
                 String   t = tok.nextToken( ).trim( );
          root.addChildTag("requiredclass",t);
   }
   }
```

Listing 4

```
TagGenerator createGroups(TagGenerator root, String dir,
  String prevDir)
    {
  StringTokenizer tokDir = new
StringTokenizer(dir,File.separator);
  boolean flag=false;
  if(dir.equals(prevDir))
        return root;
  else if(prevDir==null)
        {
    while(tokDir.hasMoreTokens( ))
    {
        String curr = tokDir.nextToken( );
        root = root.addChildTag("group",curr);
        hash.put(curr,root);
    }
        }
    else
        {
    StringTokenizer tokPrev =
        new StringTokenizer(prevDir,File.separator);
    String prevRoot=null;
    while(tokDir.hasMoreTokens( ) && tokPrev.hasMoreTokens( ))
        {
    String curr = tokDir.nextToken( );
    String prev = tokPrev.nextToken( );
    if((prevRoot==null) && (!curr.equals(prev)))
            {
        root=ancestor;
        flag=true;
            }
    else if(!curr.equals(prev) && !flag)
            {
        flag=true;
        root = (TagGenerator)hash.get(prevRoot);
            }
    if(!curr.equals(prev) || flag)
            {
        flag=true;
root = root.addChildTag("group",curr);
        hash.put(curr,root);
            }
    prevRoot=prev;
    }
    while(tokDir.hasMoreTokens( ))
        {
        String curr = tokDir.nextToken( );
        root = root.addChildTag("group",curr);
        }
        }
  flag=false;
  return root;
        }
String[ ] getTestCases(TestDescriptionWrapper td,
  File classDir,TagGenerator root) {
String executeClassName = td.getParameter("executeClass");
if (executeClassName == null) {
        System.err.println(td.getRootRelativePath( ) +
  " is apparently a runtime test but does not have an
        executeClass specified.");
return null;
}
PathClassLoaderWrapper loader =
  new PathClassLoaderWrapper(classDir.getPath( ));
  try {
        Class c = loader.loadClass(executeClassName);
        if (isMultiTest(c, loader)) {
    String[ ] args =
StringArrayWrapper.split(td.getParameter("executeArgs"));
    for (int i = 0; i < args.length; i++) {
        if (args[i].equalsIgnoreCase("-TestCaseID")) {
    // if -TestCaseID followed by ALL, drop out and determine
    // alltest cases;
    // otherwise, get args up to next option (-*).
    int first = ++i;
    if (first < args.length && args[first].equals("ALL"))
        break;
    while (i < args.length && !args[i].startsWith("-"))
        i++;
    String[ ] testCases = new String [i - first];
    System.arraycopy(args, first, testCases, 0,
        testCases.length);
    return testCases;
        }
    }
// no -TestCaseID found, or -TestCaseID ALL found
// go use reflection to determine the test cases
return getTestCases(c, loader);
        }
        else
    {
        String[ ] cases = new String[1];
        cases[0]="testcase1";
        return cases;
    }
}
catch (Exception e) {
        e.getMessage( );
        e.printStackTrace( );
}
return null;
}
private void setPackageName(TagGenerator tag,
  String path)
        {
        tag.setAttribute("package",path.substring(1));
        }
}
```

Appendix 1

XTRF Generator

Description

This document is generated from sample source code and HTML files with examples of a wide variety of Java language constructs: packages, subclasses, subinterfaces, nested classes, nested interfaces, inheriting from other packages, constructors, fields, methods, and so forth.

Here is an example of the tag "@link com.package.SubClass#publicStaticMethod( )" (shown without curly braces) in a sentence: {@link com.package.SubClass#publicStaticMethod( )}. Note that the reference must be fully qualified when inside an overview file. Any label (the second argument in @link) would be ignored by the MIF Doclet.

Here is an image:

H2 Heading

This is text below the H2 heading.

H3 Heading

This is text below the H3 heading.

H4 Heading

This is text below the H4 heading.

H5 Heading

This is text below the H5 heading.

H6 Heading

This is text below the H6 heading.

The following is a sample table.

| | |
|---|---|
| first item | This is the description of the first item. It is long enough to wrap to the next line. |

-continued

| | |
|---|---|
| Second Item | This is the description of the second item. It is long enough to wrap to the next line. |
| last Item | This is the description of the last item. It is long enough to wrap to the next line. |

Package Summary
Package com.sun.xtrf.generator
Class Summary
Classes
TagGenerator: This class provides user with ability to create xml tag with any given name and attributes.
TagLinkedGenerator Title: xtrfGenerator Description: This package is an API for generating xtrf formatted files.
XtrfGenerator: This class provides an engine for xml document generating.
TagGenerator com.sun.xtrf.generator
TagGenerator( )
com.sun.xtrf.generator
TagGenerator
Declaration
public class TagGenerator
java.lang.Object
|
+--com.sun.xtrf.generator.TagGenerator
Direct Known Subclasses: TagLinkedGenerator
Description
This class provides user with ability to create xml tag with any given name and attributes.
Member Summary
Constructors
TagGenerator( )
TagGenerator(Element el, Document doc)
Methods
TagGenerator addChildTag(java.lang.String tag)
This method allows to add child tag to this tag.
TagGenerator addChildTag(java.lang.String tag, java.lang.String name)
This method allows to add child tag to this tag.
void setAttribute(java.lang.String key, java.lang.String value)
This method allows to set attributes to this tag.
void setText(java.lang.String text)
This method allows to add text node to this tag.
Inherited Member Summary
Methods inherited from class Object:
clone( ), equals(Object), finalize( ), getClass( ), hashCode( ), notify( ), notifyAll( ),
toString( ), wait( ), wait( ), wait( )
Constructors
TagGenerator( )
public TagGenerator( )
TagGenerator(Element, Document)
public TagGenerator(com.sun.xtrf.generator.Element el, com.sun.xtrf.generator.Document doc)
Parameters:
el—current node in the DOM tree
doc—current document
Methods
addChildTag(String)
public com.sun.xtrf.generator.TagGenerator addChildTag(java.lang.String tag)
This method allows to add child tag to this tag.
Parameters:
tag—name of the tag
Returns: the object that represents child tag
addChildTag(String, String)
public com.sun.xtrf.generator.TagGenerator addChildTag(java.lang.String tag,java.lang.String name)
This method allows to add child tag to this tag.
Parameters:
tag—name of the tag
name—value of the name attribute
Returns: the object that represents child tag
setAttribute(String, String)
public void setAttribute(java.lang.String key, java. lang.String value)
This method allows to set attributes to this tag.
setText(String)
public void setText(java.lang.String text)
This method allows to add text node to this tag.
com.sun.xtrf.generator
TagLinkedGenerator
Declaration
public class TagLinkedGenerator extends TagGenerator
java.lang.Object
|
+--com.sun.xtrf.generator.TagGenerator
|
+--com.sun.xtrf.generator.TagLinkedGenerator
Description
Title: xtrfGenerator Description: This package is an API for generating xtrf formatted files. It provides classes for tag and attributes generating, and engine that creates files from generated tags Copyright: Copyright (c) 2001
Company: Sun Microsystems
Member Summary
Constructors
TagLinkedGenerator( )
TagLinkedGenerator(Element el, XmlDocument doc)
Methods
TagGenerator addChildTag(java.lang.String tag)
This method allows to add child tag to this tag.
TagGenerator addChildTag(java.lang.String tag, java.lang.String name)
Inherited Member Summary
Methods inherited from class Object
clone( ), equals(Object), finalize( ), getClass( ), hashCode( ), notify( ), notifyAll( ),
toString( ), wait( ), wait( ), wait( )
Methods inherited from class TagGenerator
setAttribute(String, String), setText(String)
Constructors
TagLinkedGenerator( )
public TagLinkedGenerator( )
TagLinkedGenerator(Element, XmlDocument)
public TagLinkedGenerator(com.sun.xtrf.generator.Element el, com.sun.xtrf.generator.XmlDocument doc)
Methods
addChildTag(String)
public com.sun.xtrf.generator.TagGenerator addChildTag(java.lang.String tag)
this method allows to add child tag to this tag
Overrides: addChildTag in class TagGenerator
Returns: the object that represents child tag
addChildTag(String, String)
public com.sun.xtrf.generator.TagGenerator addChildTag(java.lang.String tag, java.lang.String name)
Description copied from class:
com.sun.xtrf.generator.TagGenerator
This method allows to add child tag to this tag.

Overrides: addChildTag in class TagGenerator
XtrfGenerator
Declaration
public class XtrfGenerator
java.lang.Object
|
+--com.sun.xtrf.generator.XtrfGenerator
Description:
This class provides an engine for xml document generating.
Constructors
XtrfGenerator(String)
public XtrfGenerator(java.lang.String outputPath)
Parameters:
outputpath—directory that will contain generated files
Member Summary
Constructors
XtrfGenerator(java.lang.String outputpath)
Methods
TagGenerator createRoot(java.lang.String fileName)
This method creates tag that represents root of the xtrf document from given name of the tag.
void finishGenerating( )
This method should be called in order to finish generation of the xtrf files.
static
java.lang.String
getOutputPath( )
Inherited Member Summary
Methods inherited from class Object
clone( ), equals(Object), finalize( ), getClass( ), hashcode( ), notify( ), notifyAll( ),
toString( ), wait( ), wait( ), wait( )
com.sun.xtrf.generator XtrfGenerator
createRoot(String)
Methods
createRoot(String)
public com.sun.xtrf.generator.TagGenerator
createRoot(java.lang.String fileName).
This method creates tag that represents root of the xtrf document from given name of the tag.
Returns: TagGenerator object that represents this tag's node in the tree
finishGenerating( )
public void finishGenerating( )
This method should be called in order to finish generating of the xtrf files.
getOutputPath( )
public static java.lang.String getOutputPath( )
Returns: directory for files storage
XtrfGenerator com.sun.xtrf.generator
getOutputPath( )

Appendix 2

Description
This document is generated from sample source code and HTML files with examples of a wide variety of Java language constructs: packages, subclasses, subinterfaces, nested classes, nested interfaces, inheriting from other packages, constructors, fields, methods, and so forth.
XTRF Parser
com.sun.xtrf.parser
Package Summary
Package
com.sun.xtrf.parser Class Summary
Interfaces
TagHandler This is an interface for all xtrf tag handlers that will be implemented it processes tag information and attributes for further usage.
Classes
Group: This class represents group entity which is a node on the package tree.
KeywordsHandler: This class handles a requiredclass tag that also represents test group.
LinkHandler: This class handles a link tag in xtrf format.
PropertiesHandler: This class handles a requiredclass tag that also represents test group.
RequiredClassHandler: This class handles requiredclass tag that also represents a test group.
SourceHandler: This class handles a source tag in a xtrf document.
TestCase: TestCase objects embody the name of the test case and the information about this test case. The list of the objects is extracted from XTRF format files by the appropriate XML parser (files that contain all necessary information about test parameters and execution in XML format).
TestClass: TestClass objects embody the name of the class and the required information about the test class. The list of the objects is extracted from XTRF format files by the appropriate XML parser(files that contain all necessary information about test parameters and execution in XML format).
TestGroup: This abstract class represents an abstract entity which is one of TestSuite, TestPackage, TestClass or TestCase. It provides information about the children of this TestGroup and value of the name attribute. It also provides a client programmer with the ability to add its own tag to the format and class that handles this tag (This class should implement the TagHandler interface).
TestPackage. The TestPackage object embodies the name of the testpackage and needed information. The list of the objects is extracted from XTRF format files by the appropriate XML parser (files that contain all necessary information about test parameters and execution in XML format).
TestSuite: TestSuite objects embody the name of the testsuite and information about their children. The list of the objects is extracted from XTRF format files by the appropriate XML parser(files that contain all necessary information about test parameters and execution in XML format).
XtrfApi This is an API class for the XTRF parser that contains methods that allow user to use this parser as a stand-alone application.
Group
Declaration
public class Group extends TestGroup
java.lang.Object
|
+--com.sun.xtrf.parser.TestGroup
|
+--com.sun.xtrf.parser.Group
Description
This class represents group entity which is a node on the package tree.
Inherited Member Summary
Fields inherited from class TestGroup
attributesMap, el, keywords, parser
Methods inherited from class Object
clone( ), equals(Object), finalize( ), getClass( ), hashCode( ), notify( ), notifyAll( ), toString( ), wait( ), wait( ), wait( )

Methods inherited from class TestGroup
addTagHandler(String, TagHandler), getChildren( ), getKeywords( ), getName( ), getProperties( ), getRequiredClasses( ), getSource( )
KeywordsHandler
Declaration
public class KeywordsHandler extends TestGroup implements
TagHandler
java.lang.Object
|
+--com.sun.xtrf.parser.TestGroup
|
+--com.sun.xtrf.parser.KeywordsHandler
All Implemented Interfaces: TagHandler
Description
This class handles a requiredclass tag that also represents a test group.
Member Summary
Constructors
KeywordsHandler( )
Methods
void handleTag(TestGroup group, org.w3c.dom.Node node)
This method handles requredclass tag and its children.
Inherited Member Summary
Fields inherited from class TestGroup
attributesMap, el, keywords, parser
Methods inherited from class Object
clone( ), equals(Object), finalize( ), getClass( ), hashcode( ), notify( ), notifyAll( ), toString( ), wait( ), wait( ), wait( )
Methods inherited from class TestGroup
addTagHandler(String, TagHandler), getChildren( ), getKeywords( ), getName( ), getProperties( ), getRequiredClasses( ), getSource( )
Constructors
KeywordsHandler( )
public KeywordsHandler( )
Methods
handleTag(TestGroup, Node)
public void handleTag(com.sun.xtrf.parser.TestGroup group, org.w3c.dom.Node node)
This method handles requredclass tag and its children.
Specified By: handleTag in interface TagHandler
LinkHandler
Declaration
public class LinkHandler implements TagHandler
java.lang.Object
|
+--com.sun.xtrf.parser.LinkHandler
All Implemented Interfaces: TagHandler
Description
This class handles link tag in xtrf format
Constructors
LinkHandler( )
public LinkHandler( )
Methods
handleTag(TestGroup, Node)
public void handleTag(com.sun.xtrf.parser.TestGroup group, org.w3c.dom.Node node)
Member Summary
Constructors
LinkHandler( )
Methods
void handleTag(TestGroup group, org.w3c.dom.Node node)
This method handles link tag.
Inherited Member Summary
Methods inherited from class Object
clone( ), equals(Object), finalize( ), getClass( ), hashCode( ), notify( ), notifyAll( ), toString( ), wait( ), wait( ), wait( )
LinkHandler com.sun.xtrf.parser
handleTag(TestGroup, Node)
This method handles link tag
Specified By: handleTag in interface TagHandler
PropertiesHandler
Declaration
public class PropertiesHandler extends TestGroup implements
TagHandler
java.lang.Object
|
+--com.sun.xtrf.parser.TestGroup
|
+--com.sun.xtrf.parser.PropertiesHandler
All Implemented Interfaces: TagHandler
Description
This class handles requredclass tag that also represents test group.
Member Summary
Constructors
PropertiesHandler( )
Methods
void handleTag(TestGroup group, org.w3c.dom.Node node)
This method handles requiredclass tag and its children.
Inherited Member Summary
Fields inherited from class TestGroup
attributesMap, el, keywords, parser
Methods inherited from class Object
clone( ), equals(Object), finalize( ), getClass( ), hashCode( ), notify( ), notifyAll( ), toString( ), wait( ), wait( ), wait( )
Methods inherited from class TestGroup
addTagHandler(String, TagHandler), getChildren( ), getKeywords( ), getName( ), getProperties( ), getRequiredClasses( ), getSource( )
Constructors
PropertiesHandler( )
public PropertiesHandler( )
Methods
handleTag(TestGroup, Node)
public void handleTag(com.sun.xtrf.parser.TestGroup group, org.w3c.dom.Node node)
This method handles requiredclass tag and its children.
Specified By: handleTag in interface TagHandler
RequiredClassHandler
Declaration
public class RequiredClassHandler extends TestGroup implements
TagHandler
java.lang.Object
|
+--com.sun.xtrf.parser.TestGroup
|
+--com.sun.xtrf.parser.RequiredClassHandler
All Implemented Interfaces: TagHandler
Description
This class handles requiredclass tag that also represents a test group.

Member Summary
Constructors
RequiredClassHandler( )
Methods
void handleTag(TestGroup group, org.w3c.dom.Node node)
This method handles requredclass tag and its children.
Inherited Member Summary
Fields inherited from class TestGroup
attributesMap, el, keywords, parser
Methods inherited from class Object
clone( ), equals(Object), finalize( ), getClass( ), hashCode( ), notify( ), notifyAll( ), toString( ), wait( ), wait( ), wait( )
Methods inherited from class TestGroup
addTagHandler(String, TagHandler), getChildren( ), getKeywords( ), getName( ), getProperties( ), getRequiredClasses( ), getSource( )
Constructors
RequiredClassHandler( )
public RequiredClassHandler( )
Methods
handleTag(TestGroup, Node)
public void handleTag(com.sun.xtrf.parser.TestGroup group, org.w3c.dom.Node node)
This method handles requredclass tag and its children.
Specified By: handleTag in interface TagHandler
SourceHandler
Declaration
public class SourceHandler implements TagHandler
java.lang.Object
|
+--com.sun.xtrf.parser.SourceHandler
All Implemented Interfaces: TagHandler
Description
This class handles source tag in xtrf document
Constructors
SourceHandler( )
public SourceHandler( )
Methods
handleTag(TestGroup, Node)
public void handleTag(com.sun.xtrf.parser.TestGroup group, org.w3c.dom.Node node)
Member Summary
Constructors
SourceHandler( )
Methods
void handleTag(TestGroup group, org.w3c.dom.Node node)
This method handles source tag.
Inherited Member Summary
Methods inherited from class Object
clone( ), equals(Object), finalize( ), getClass( ), hashCode( ), notify( ), notifyAll( ),toString( ), wait( ), wait( ), wait( )
Constructors
SourceHandler( )
public SourceHandler( )
Methods
handleTag(TestGroup, Node)
public void handleTag(com.sun.xtrf.parser.TestGroup group, org.w3c.dom.Node node)
This method handles source tag.
Specified By: handleTag in interface TagHandler.

TagHandler
Declaration
public interface TagHandler
All Known Implementing Classes: KeywordsHandler, LinkHandler, SourceHandler, PropertiesHandler, RequiredClassHandler
Description
This is an interface for all xtrf tag handlers that will be implemented it processes tag information and attributes for further usage.
Methods
handleTag(TestGroup, Node)
public void handleTag(com.sun.xtrf.parser.TestGroup group, org.w3c.dom.Node node)
Parameters:
group—test group to which this tag belongs
node—node that represents this tag
Member Summary
Methods
void handleTag(TestGroup group, org.w3c.dom.Node node)
TestCase
Declaration
public class TestCase extends TestGroup
java.lang.Object
|
+--com.sun.xtrf.parser.TestGroup
|
+--com.sun.xtrf.parser.TestCase
Description
TestCase objecta embody the name of the test case and the information about this test case. The list of the objects is extracted from XTRF format files by the appropriate XML parser(files that contain all necessary information about test parameters and execution in XML format).
Member Summary
Methods java.lang.String getJavaName( )
Gets java name of this test case that consists from package name+class name+test case name.
java.util.Properties getProperties( )
Inherited Member Summary
Fields inherited from class TestGroup
attributesMap, el, keywords, parser
Methods inherited from class Object
clone( ), equals(Object), finalize( ), getClass( ), hashcode( ), notify( ), notifyAll( ), toString( ), wait( ), wait( ), wait( )
Methods inherited from class TestGroup
addTagHandler(String, TagHandler), getChildren( ), getKeywords( ), getName( ), getRequiredClasses( ), getSource( )
Methods
getJavaName( )
public java.lang.String getJavaName( )
Gets java name of this test case that consists from package name+class name+test case name.
getProperties( )
public java.util.Properties getProperties( )
Description copied from class: com.sun.xtrf.parser.TestGroup
This method returns this group's properties as they appear in XTRF.

Overrides: getProperties in class TestGroup
TestClass
Declaration
public class TestClass extends TestGroup
java.lang.Object
|
+--com.sun.xtrf.parser.TestGroup
|
+--com.sun.xtrf.parser.TestClass
Description
TestClass objects embody the name of the class and the required information about the test class. The list of the objects is extracted from XTRF format files by the appropriate XML parser(files that contain all necessary information about test parameters and execution in XML format).
Inherited Member Summary
Fields inherited from class TestGroup
attributesMap, el, keywords, parser
Methods inherited from class Object
clone( ), equals(Object), finalize( ), getClass( ), hashCode( ), notify( ), notifyAll( ), toString( ), wait( ), wait( ), wait( )
Methods inherited from class TestGroup
addTagHandler(String, TagHandler), getChildren( ), getKeywords( ), getName( ), getProperties( ), getRequiredClasses( ), getSource( )
TestGroup
Declaration
public abstract class TestGroup
java.lang.Object
|
+--com.sun.xtrf.parser.TestGroup
Direct Known Subclasses: Group, KeywordsHandler, PropertiesHandler, RequiredClassHandler, TestCase, TestClass, TestPackage, TestSuite
Description
This abstract class represents an abstract entity which is either TestSuite, TestPackage,.TestClass or TestCase. It provides information about the children of this TestGroup and value of the name attribute. It also provides a client programmer with the ability to add its own tag to the format and class that handles this tag (This class should implement TagHandler interface)
Member Summary
Fields
protected
java.util.Map
attributesmap
protected Element el
current node in the parsed tree
protected java.util.LinkedList
keywords
protected XTRFParser parser
Instance of the class that handles parsing.
Constructors
TestGroup( )
Methods
void addTagHandler(java.lang.String tagName, TagHandler handler)
Allows adding xml tag and class that handles it to the parser.
TestGroup[ ] getChildren( )
Get the list of the children of this group may consists of different groups.
java.util.LinkedList getKeywords( )
java.lang.String getName( )
Get value of the name attribute.
java.util.Properties getProperties( )
This method returns this group's properties as they appear in XTRF.
java.util.Map getRequiredClasses( )
this method returns map that containes pairs of the form: requiredclass name—its source.
java.lang.String getSource( )
This method returns source of this test group.
Inherited Member Summary
Methods inherited from class Object
clone( ), equals(Object), finalize( ), getClass( ), hashCode( ), notify( ), notifyAll( ),toString( ), wait( ), wait( ), wait( )
Fields
attributesMap
protected java.util.Map attributesMap
el
protected com.sun.xtrf.parser.Element el
Current node in the parsed tree.
Keywords
protected java.util.LinkedList keywords
parser
protected com.sun.xtrf.parser.XTRFParser parser
instance of the class that handles parsing
Constructors
TestGroup( )
public TestGroup( )
Methods
addTagHandler(String, TagHandler)
public void addTagHandler(java.lang.String tagName, com.sun.xtrf.parser.TagHandler handler)
allows adding xml tag and class that handles it to the parser
getChildren( )
public com.sun.xtrf.parser.TestGroup[] getChildren( )
Get the list of the children of this group may consists of different groups
getKeywords( )
public java.util.LinkedList getKeywords( )
getName( )
public java.lang.String getName( )
get value of the name attribute
getProperties( )
public java.util.Properties getProperties( )
This method returns this group's properties as they appear in XTRF.
Returns: properties of this test group. If there are no properties returns null.
getRequiredClasses( )
public java.util.Map getRequiredClasses( )
This method returns map that containes pairs of the form: requiredclass name—its source
getSource( )
public java.lang.String getSource( )
This method returns source of this test group.
Returns: source of this group null if there is no source
TestPackage
Declaration
public class TestPackage extends TestGroup
java.lang.Object
|
+--com.sun.xtrf.parser.TestGroup
|
+--com.sun.xtrf.parser.TestPackage
Description
TestPackage object embodies the name of the testpackage and needed information The list of the objects is extracted from XTRF format files by the appropriate XML parser(files that contain all necessary information about test parameters and execution in XML format).
Inherited Member Summary
Fields inherited from class TestGroup
attributesMap, el, keywords, parser
Methods inherited from class Object.
clone( ), equals(Object), finalize( ), getClass( ), hashcode( ), notify( ), notifyAll( ), toString( ), wait( ), wait( ), wait( )
Methods inherited from class TestGroup
addTagHandler(String, TagHandler), getChildren( ), getKeywords( ), getName( ), getProperties( ), getRequiredClasses( ), getSource( )
TestSuite
Declaration
public class TestSuite extends TestGroup
java.lang.Object
|
+--com.sun.xtrf.parser.TestGroup
|
+--com.sun.xtrf.parser.TestSuite
Description
TestSuite object embody the name of the testsuite and information about its children The list of the objects is extracted from XTRF format files by the appropriate XML parser(files that contain all necessary information about test parameters and execution in XML format).
Inherited Member Summary
Fields inherited from class TestGroup
attributesMap, el, keywords, parser
Methods inherited from class Object
clone( ), equals(Object), finalize( ), getClass( ), hashCode( ), notify( ), notifyAll( ), toString( ), wait( ), wait( ), wait( )
Methods inherited from class TestGroup
addTagHandler(String, TagHandler), getChildren( ), getKeywords( ), getName( ), getProperties( ), getRequiredClasses( ), getSource( )
XtrfApi
Declaration
public class XtrfApi
java.lang.Object
|
+--com.sun.xtrf.parser.XtrfApi
Description
This is an api class for xtrf parser contains methods that allow user to use this parser as a stand-alone application.
Member Summary
Constructors
XtrfApi( )
Methods
static
java.lang.String
getLocation( )
TestGroup getRoot(java.io.File file)
get root element of xtrf file
void init( )
load tag and attributes handlers
void setLocation(java.lang.String location)
sets physical location of xtrf format files
Inherited Member Summary
Methods inherited from class Object
clone( ), equals(Object), finalize( ), getClass( ), hashCode( ), notify( ), notifyAll( ), toString( ), wait( ), wait( ), wait( )

Constructors
XtrfApi( )
public XtrfApi( )
Methods
getLocation( )
public static java.lang.String getLocation( )
getRoot(File)
public com.sun.xtrf.parser.TestGroup getRoot(java.io.File file)
get root element of xtrf file
init( )
public void init( )
load tag and attributes handlers
setLocation(String)
public void setLocation(java.lang.String location)
sets physical location of xtrf format files

The invention claimed is:

1. A method, comprising:
providing, on a server, a plurality of suites of test programs, each of which is executable on one or more computing devices that are coupled to said server to test the one or more computing devices, wherein each of said suites of test programs is configured to execute on the one or more computing devices using a different test harness;
converting each of the plurality of suites to a common representation that is executable using a common test harness;
said server transferring one or more converted suites of test programs to at least one of said one or more computing devices for execution thereof by said at least one computing device using said common test harness.

2. The method according to claim 1, further comprising controlling from said server said execution of one or more of the converted suites of test programs using the common test harness.

3. The method according to claim 1, wherein said converting includes converting each of said suites of test programs to a common intermediate format, and thereafter to the common representation for use during execution of the converted suites of test programs on said one or more computing devices.

4. The method according to claim 3, wherein said common intermediate format is a markup language.

5. The method according to claim 4, wherein said markup language is XML.

6. A computer readable storage medium comprising program instructions, wherein the program instructions are computer executable to:
provide, on a server, a plurality of suites of test programs, each of which is executable on one or more computing devices that are coupled to said server to test the one or more computing devices, wherein each of said suites of test programs is configured to execute on the one or more computing devices using a different test harness;
convert each of the plurality of suites to a common representation that is executable using a common test harness;
transfer from said server one or more converted suites of test programs to at least one of said one or more computing devices for execution thereof by said at least one computing device using said common test harness.

7. The computer readable storage medium according to claim 6, further comprising program instructions that are computer executable to control, from said server, said execution of one or more of the converted suites of test programs using the common test harness.

8. The computer readable storage medium according to claim 6, wherein said program instructions are computer executable to convert each of the plurality of suites to a common intermediate format, and thereafter to the common representation for use during execution of the converted suites of test programs on said one or more computing devices.

9. The computer readable storage medium according to claim 8, wherein said common intermediate format is a markup language.

10. The computer readable storage medium according to claim 9, wherein said markup language is XML.

11. A server apparatus for testing computing devices, comprising:
- a communication interface for coupling a plurality of said computing devices therewith; and
- a processor configured to:
  - provide a plurality of suites of test programs for execution by said computing devices that are coupled to said server apparatus to test the one or more computing devices, wherein each of said suites of test programs is configured to execute on the one or more computing devices using a different test harness;
  - convert each of said plurality of suites to a common representation that is executable using a common test harness;
  - transfer one or more converted suites of test programs to at least one of said one or more computing devices via said communication interface for execution by said at least one computing device using said common test harness; and
  - control execution of at least one converted suite of test program on one of said one or more computing devices.

12. The server apparatus according to claim 11, wherein said processor is configured to convert each of said plurality of suites of test programs into a common intermediate format, and thereafter to said common representation.

13. The server apparatus according to claim 12, wherein said common intermediate format is a markup language.

14. The method according to claim 1, wherein each of the plurality of suites of test programs is configured to test different functionality.

15. The computer-readable storage medium according to claim 6, wherein each of the plurality of suites of test programs is configured to test different functionality.

16. The server apparatus according to claim 11, wherein each of the plurality of suites of test programs is configured to test different functionality.

17. The method of claim 1, wherein the one or more computing devices are mobile devices.

18. The computer readable storage medium according to claim 6, wherein the one or more computing devices are mobile devices.

19. The server apparatus according to claim 11, wherein the one or more computing devices are mobile devices.

* * * * *